US012608279B2

(12) United States Patent
Gupta et al.

(10) Patent No.: US 12,608,279 B2
(45) Date of Patent: Apr. 21, 2026

(54) UTILIZING FIXED-SIZED AND VARIABLE-LENGTH DATA CHUNKS TO PERFORM SOURCE SIDE DEDUPLICATION

(71) Applicant: Cohesity, Inc., San Jose, CA (US)

(72) Inventors: Apurv Gupta, Bengaluru (IN); Mandar Suresh Naik, Pune (IN); Zhihuan Qiu, San Jose, CA (US); Gurunarayanan Nagasubramanian, Bengaluru (IN); Anirban Mitra, Kolkata (IN)

(73) Assignee: Cohesity, Inc., Santa Clara, CA (US)

( * ) Notice: Subject to any disclaimer, the term of this patent is extended or adjusted under 35 U.S.C. 154(b) by 126 days.

(21) Appl. No.: 17/731,056

(22) Filed: Apr. 27, 2022

(65) Prior Publication Data

US 2023/0350763 A1     Nov. 2, 2023

(51) Int. Cl.
| | |
|---|---|
| *G06F 11/14* | (2006.01) |
| *G06F 11/1446* | (2026.01) |
| *G06F 16/215* | (2019.01) |

(52) U.S. Cl.
CPC ........ *G06F 11/1453* (2013.01); *G06F 16/215* (2019.01); *G06F 2201/84* (2013.01)

(58) Field of Classification Search
CPC . G06F 9/466; G05B 19/4183; G05B 19/4185; G05B 19/41865
See application file for complete search history.

(56) References Cited

U.S. PATENT DOCUMENTS

| | | | | |
|---|---|---|---|---|
| 8,234,468 | B1 * | 7/2012 | Deshmukh .......... | G06F 11/1453 711/E12.103 |
| 10,810,035 | B2 | 10/2020 | Guturi et al. | |
| 10,915,260 | B1 * | 2/2021 | Lei ........................ | G06F 3/0671 |
| 2011/0016095 | A1 * | 1/2011 | Anglin ................ | G06F 11/1453 711/216 |
| 2012/0290537 | A1 * | 11/2012 | Smith ................. | G06F 16/1752 707/700 |
| 2013/0268497 | A1 * | 10/2013 | Baldwin .............. | G06F 3/0683 707/E17.002 |

(Continued)

OTHER PUBLICATIONS

International Search Report and Written Opinion of International Application No. PCT/US2023/020010 dated Jul. 26, 2023, 14 pp.

(Continued)

*Primary Examiner* — Etienne P Leroux
*Assistant Examiner* — Farhad Agharahimi
(74) *Attorney, Agent, or Firm* — Shumaker & Sieffert, P.A.

(57) ABSTRACT

Range information associated with one or more objects is received from a storage system. One or more missing ranges and/or one or more mismatched ranges associated with the one or more objects is determined based on the received range information. A plurality of data chunk identifiers associated with a plurality of variable-length data chunks included in the one or more determined ranges associated with the one or more objects is provided to the storage system. A response that is used to identify among the plurality of variable-length data chunks, one or more variable-length data chunks not already stored in a storage associated with the storage system is received from the storage system. Content of the identified one or more variable-length data chunks is provided to the storage system.

15 Claims, 9 Drawing Sheets

100

(56) References Cited

U.S. PATENT DOCUMENTS

| | | | |
|---|---|---|---|
| 2014/0101113 A1* | 4/2014 | Zhang ................. | H04L 67/5681 |
| | | | 707/E17.002 |
| 2017/0277711 A1* | 9/2017 | Therrien ............. | G06F 16/1748 |
| 2018/0270292 A1* | 9/2018 | Perahia ................. | H04W 76/19 |
| 2023/0062644 A1 | 3/2023 | Qiu et al. | |

OTHER PUBLICATIONS

International Preliminary Report on Patentability from International Application No. PCT/US2023/020010 dated Nov. 7, 2024, 12 pp.

* cited by examiner

100

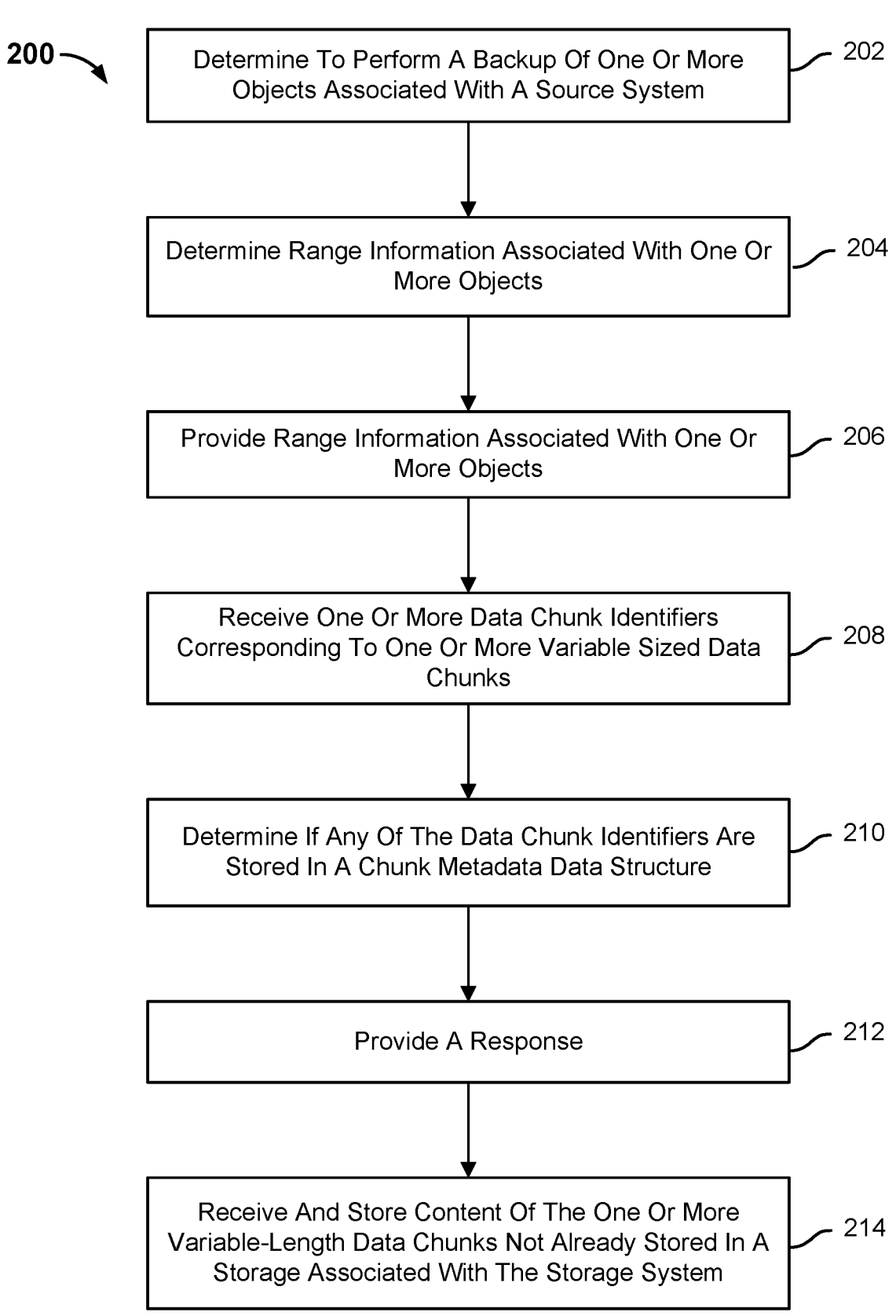

200

Determine To Perform A Backup Of One Or More
Objects Associated With A Source System — 202

Determine Range Information Associated With One Or
More Objects — 204

Provide Range Information Associated With One Or
More Objects — 206

Receive One Or More Data Chunk Identifiers
Corresponding To One Or More Variable Sized Data
Chunks — 208

Determine If Any Of The Data Chunk Identifiers Are
Stored In A Chunk Metadata Data Structure — 210

Provide A Response — 212

Receive And Store Content Of The One Or More
Variable-Length Data Chunks Not Already Stored In A
Storage Associated With The Storage System — 214

FIG. 2A

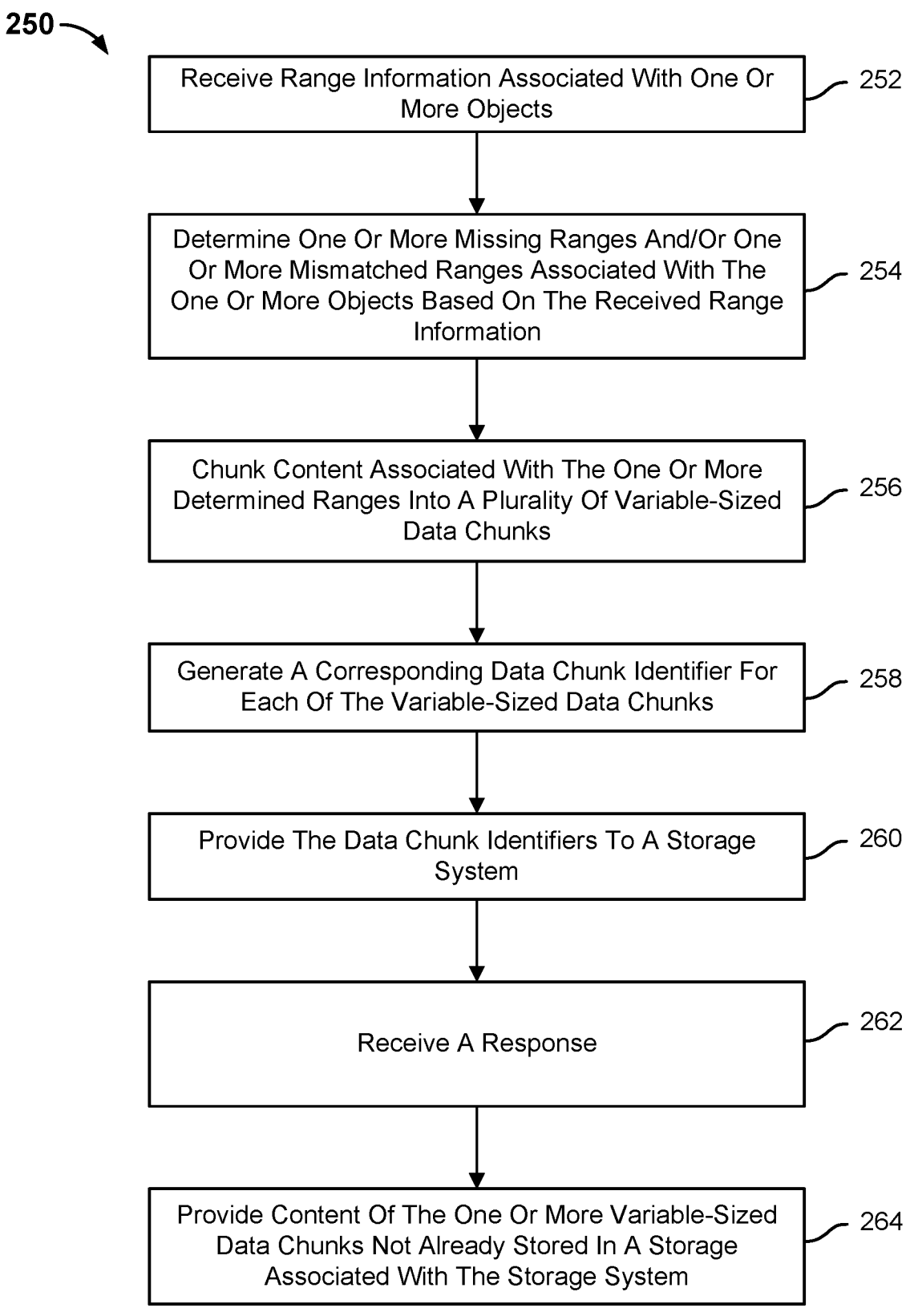

250

Receive Range Information Associated With One Or More Objects — 252

Determine One Or More Missing Ranges And/Or One Or More Mismatched Ranges Associated With The One Or More Objects Based On The Received Range Information — 254

Chunk Content Associated With The One Or More Determined Ranges Into A Plurality Of Variable-Sized Data Chunks — 256

Generate A Corresponding Data Chunk Identifier For Each Of The Variable-Sized Data Chunks — 258

Provide The Data Chunk Identifiers To A Storage System — 260

Receive A Response — 262

Provide Content Of The One Or More Variable-Sized Data Chunks Not Already Stored In A Storage Associated With The Storage System — 264

FIG. 2B

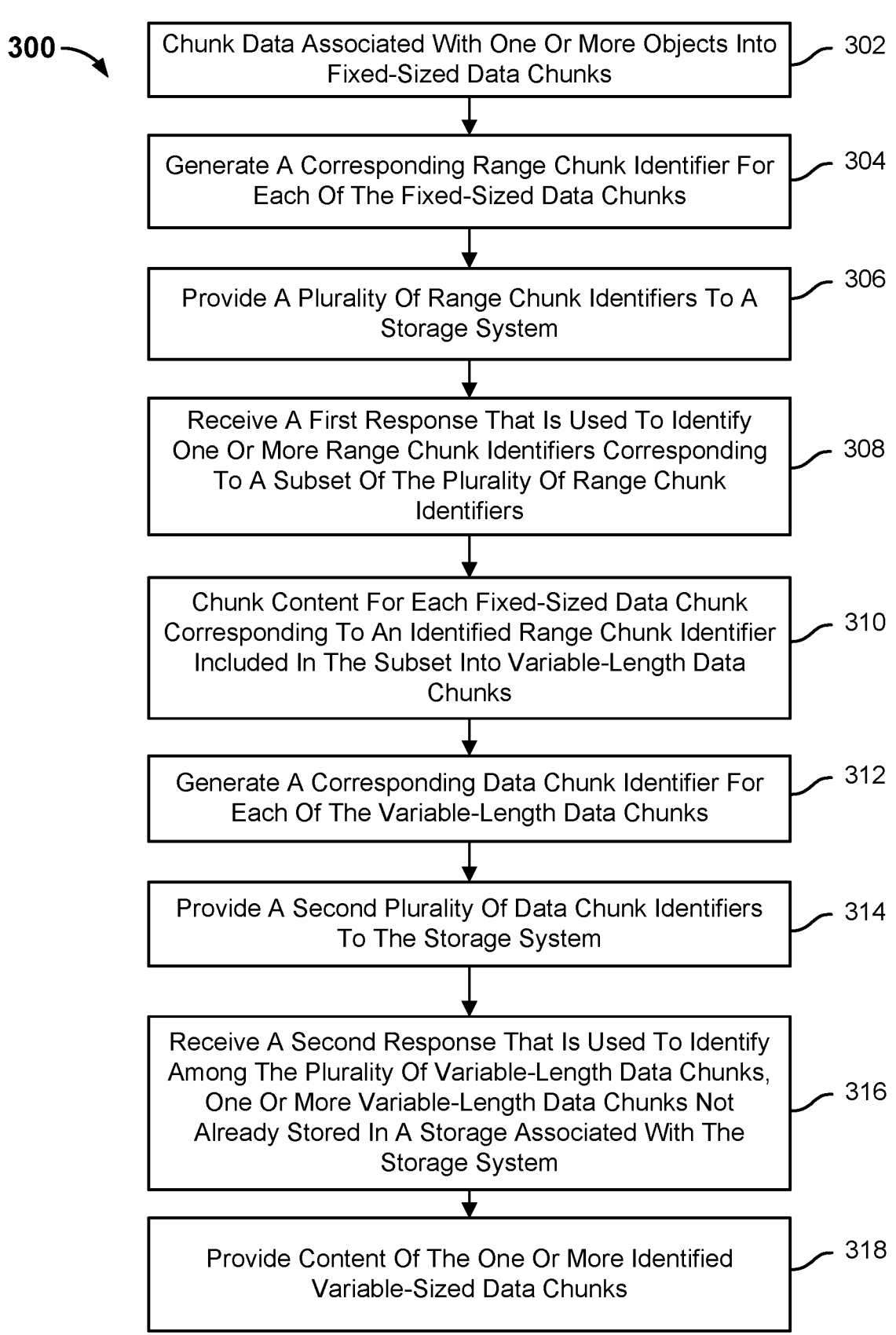

300

Chunk Data Associated With One Or More Objects Into Fixed-Sized Data Chunks — 302

Generate A Corresponding Range Chunk Identifier For Each Of The Fixed-Sized Data Chunks — 304

Provide A Plurality Of Range Chunk Identifiers To A Storage System — 306

Receive A First Response That Is Used To Identify One Or More Range Chunk Identifiers Corresponding To A Subset Of The Plurality Of Range Chunk Identifiers — 308

Chunk Content For Each Fixed-Sized Data Chunk Corresponding To An Identified Range Chunk Identifier Included In The Subset Into Variable-Length Data Chunks — 310

Generate A Corresponding Data Chunk Identifier For Each Of The Variable-Length Data Chunks — 312

Provide A Second Plurality Of Data Chunk Identifiers To The Storage System — 314

Receive A Second Response That Is Used To Identify Among The Plurality Of Variable-Length Data Chunks, One Or More Variable-Length Data Chunks Not Already Stored In A Storage Associated With The Storage System — 316

Provide Content Of The One Or More Identified Variable-Sized Data Chunks — 318

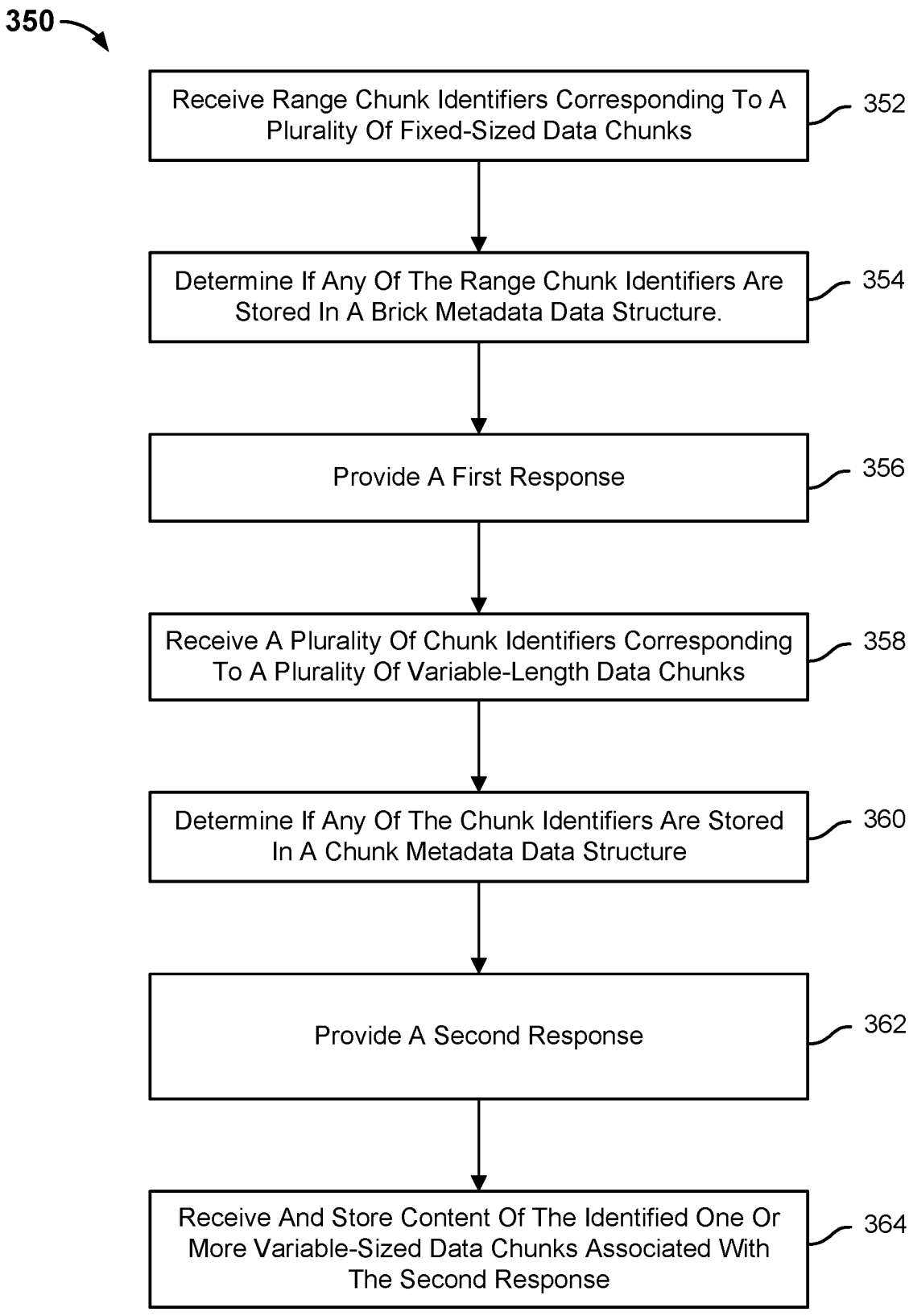

Receive Range Chunk Identifiers Corresponding To A Plurality Of Fixed-Sized Data Chunks          352

Determine If Any Of The Range Chunk Identifiers Are Stored In A Brick Metadata Data Structure.          354

Provide A First Response          356

Receive A Plurality Of Chunk Identifiers Corresponding To A Plurality Of Variable-Length Data Chunks          358

Determine If Any Of The Chunk Identifiers Are Stored In A Chunk Metadata Data Structure          360

Provide A Second Response          362

Receive And Store Content Of The Identified One Or More Variable-Sized Data Chunks Associated With The Second Response          364

Determine To Perform A Backup Of One Or More Objects Associated With A Source System — 602

Determine Range Information Associated With One Or More Objects — 604

Provide Range Information Associated With One Or More Objects — 606

Ingest And Store Data Associated With The One Or More Objects — 608

650

Receive Range Information Associated With One Or More Objects — 652

Determine One Or More Missing Ranges And/Or One Or More Mismatched Ranges Associated With The One Or More Objects Based On The Received Range Information — 654

Provide Content Associated With The One Or More Determined Ranges — 656

UTILIZING FIXED-SIZED AND VARIABLE-LENGTH DATA CHUNKS TO PERFORM SOURCE SIDE DEDUPLICATION

BACKGROUND OF THE INVENTION

A storage system may back up data from a source system, but constraints associated with a backup, such as network speed and/or an amount of data to be backed up (e.g., 25 TB), may prevent the backup from being completed within a specified amount of time (e.g., 3-5 hours). The source system may reduce the amount of data that is backed up to enable the backup to be completed within the specified amount of time by chunking the backup data into variable-length data chunks, generating corresponding data chunk identifiers for the variable-length data chunks, and sending the corresponding data chunk identifiers to the storage system. In response, the storage system may determine from the corresponding data chunk identifiers which of the variable-length data chunks that are not currently stored by the storage system and provide to the source system a list of one or more data chunk identifiers corresponding to data chunks that are not currently stored by the storage system. The source system may subsequently provide to the storage system the one or more data chunks corresponding to the one or more data chunk identifiers included in the list.

Although this may reduce the amount of data that is backed up, the steps of chunking the backup data into variable-length data chunks and generating corresponding data chunk identifiers for the variable-length data chunks are a highly CPU intensive process for the source system. For a large amount of data (e.g., 25 TB) having a small amount of data changes (e.g., less than a threshold amount of data change), the overall time to back up the data may be longer than if the source system merely sent the data to be backed up without chunking the data and generating corresponding data chunk identifiers to the data chunks.

BRIEF DESCRIPTION OF THE DRAWINGS

Various embodiments of the invention are disclosed in the following detailed description and the accompanying drawings.

FIG. 2A is a flow diagram illustrating a process for reducing the amount of data received from a source system during a backup in accordance with some embodiments.

FIG. 2B is a flow diagram illustrating a process for performing source side deduplication in accordance with some embodiments.

FIG. 3A is a flow diagram illustrating a process for performing source side deduplication in accordance with some embodiments.

FIG. 3B is a flow diagram illustrating a process for reducing the amount of data received from a source system during a backup in accordance with some embodiments.

DETAILED DESCRIPTION

Figure 1:
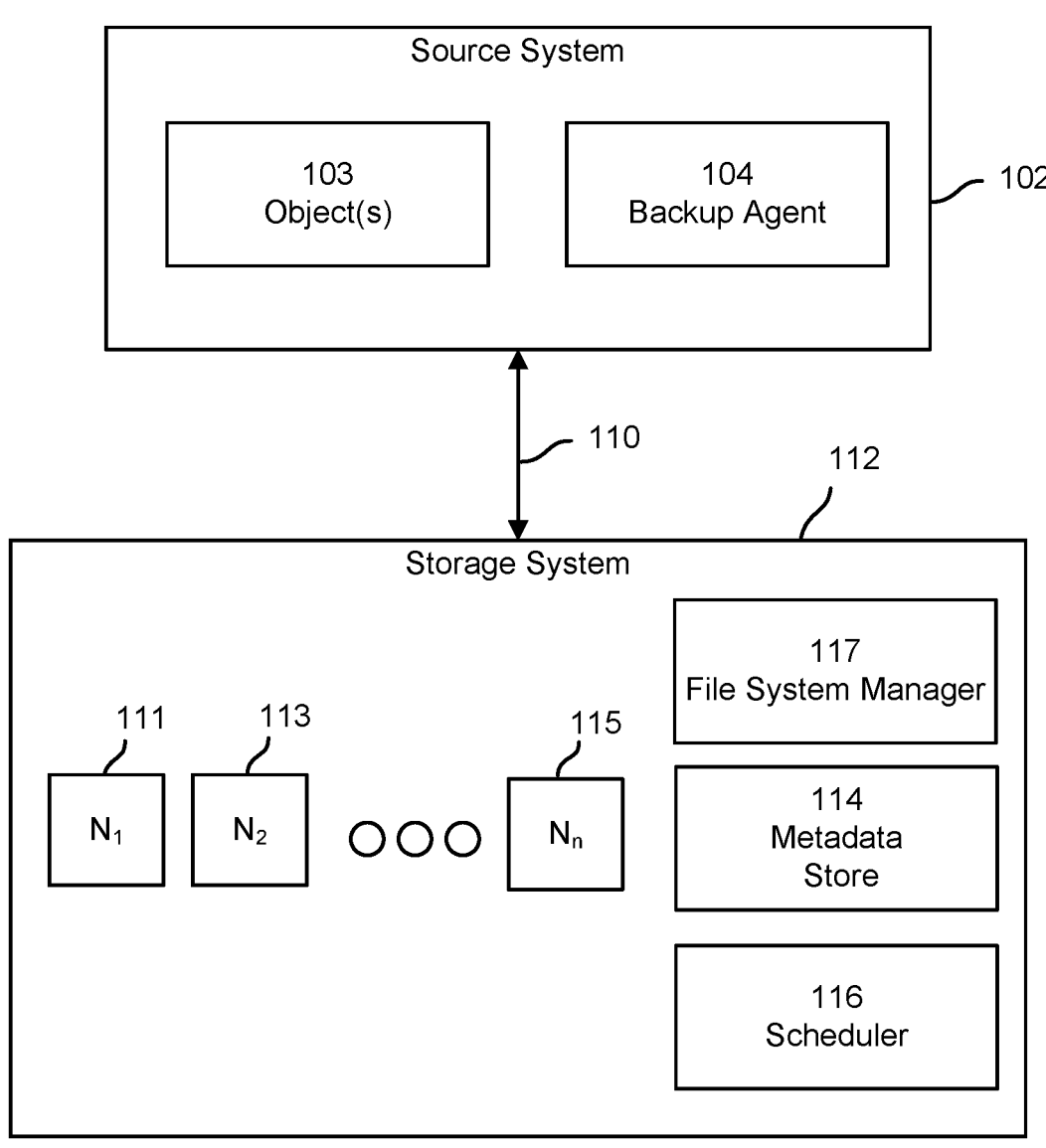
FIG. 1 is a block diagram illustrating an embodiment of a system for performing source side deduplication.

Techniques to perform source side deduplication are disclosed. There is a cost associated with performing a backup of one or more objects associated with a source system. The associated costs include an amount of CPU resources used by the source system, an amount of time needed to complete the backup, an amount of network bandwidth needed to provide the data associated with the one or more objects from the source system to a storage system, etc. When the delta between two successive backups is small (e.g., less than a threshold amount of data), a cost associated with performing a backup of a source system may be dominated by the cost associated with generating data chunks and comparing data chunk identifiers corresponding to the generated data chunks to identify data chunks(s) not stored by the storage system. The disclosed techniques may reduce the costs associated with performing the backup of one or more objects associated with the source system. An object may refer to a data object (e.g., a file, a virtual machine, a database, an application, a container, etc.). Although the techniques are described with respect to backup, the techniques disclosed herein may be applicable whenever a data management operation (e.g., backup, migration, replication, archive, etc.) is performed for a cohort of data that is provided from a first system to a second system.

When the storage system performs a backup, it receives data chunks associated with one or more objects, stores the data chunks associated with one or more objects, and generates a tree data structure that enables the data chunks associated with the one or more objects to be located. In other embodiments, the storage system receives data associated with one or more objects, chunks the data associated with the one or more objects into a plurality of data chunks (e.g., variable-length data chunks), stores the data chunks associated with the one or more objects, and generates a tree data structure that enables the data chunks associated with the one or more objects to be located. An example of a tree data structure is described in U.S. patent application Ser. No. 16/287,214 entitled "Deploying A Cloud Instance Of A User Virtual Machine," filed on Feb. 27, 2019, which is incorporated herein by reference for all purposes. The storage system generates and maintains metadata, such as a chunk metadata data structure, a chunk file metadata data structure, and a brick metadata data structure.

The chunk metadata data structure is comprised of a plurality of entries. Each entry associates a data chunk identifier corresponding to a data chunk with a chunk file identifier corresponding to a chunk file storing the data chunk. The chunk file metadata data structure is comprised of a plurality of entries. Each entry associates a chunk file identifier corresponding to a chunk file with one or more data chunk identifiers corresponding to one or more data chunks. This indicates the one or more data chunks that are stored in the chunk file having the chunk file identifier.

The tree data structure includes a plurality of nodes that are associated with corresponding data bricks. A data brick is associated with one or more data chunks. A data brick may have a fixed length (e.g., 256 kb, 512 kb, etc.). The one or more data chunks associated with the data brick may each have a size of 8 kb-16 kb. The brick metadata data structure is comprised of a plurality of entries. Each entry corresponds to a data brick and associates a brick identifier corresponding to the data brick with a range chunk identifier corresponding to a particular range of an object. For example, the range chunk identifier may correspond to a range of 256 kb-512 kb of an object. The range chunk identifier corresponds to the one or more data chunks included in the particular range of the object. For example, data brick 1 may be associated with chunks C1, C2, and C3. A range chunk identifier C123 may be computed for the combination of chunks C1, C2, and C3 and stored in the entry corresponding to data brick 1. The brick metadata data structure is updated after a backup of a source system is completed.

In a first technique, a storage system includes a scheduler that determines a backup of one or more objects associated with a source system that is to be performed. In some embodiments, a full backup of an object is determined to be performed. In some embodiments, an incremental backup of the object is determined to be performed. The one or more objects associated with the source system were previously backed up to the storage system. The backup system includes a file system manager. The scheduler provides to the file system manager a corresponding object identifier for each of the one or more objects. The file system manager utilizes the corresponding object identifier to determine corresponding range information associated with the one or more objects.

Range information for an object includes one or more range chunk identifiers, a corresponding offset for each of the one or more range chunk identifiers, and a corresponding length for the one or more data chunks associated with a range chunk identifier for each of the one or more range chunk identifiers. In some embodiments, the range information for an object includes one or more data chunk identifiers corresponding to the one or more data chunks associated with a range chunk identifier for each of the one or more range chunk identifiers. The storage system provides the corresponding range information for the one or more objects to the source system.

The source system includes a backup agent. In response to receiving the corresponding range information for the one or more objects associated with the source system, the backup agent determines whether there are one or more missing ranges and/or one or more mismatched ranges associated with the one or more objects based on the corresponding range information. A missing range corresponds to a portion of an object that was not previously backed up. For example, there may have been data appended to the object since the previous backup. The backup agent may determine that there is a missing range in response to a determination that the received range information does not cover the missing range.

In some embodiments, a mismatched range corresponds to a portion of an object that was overwritten with new data since the previous backup. In some embodiments, a mismatched range corresponds to a portion of an object where data was inserted into the range since the previous backup. The backup agent may determine that a mismatched range exists by comparing the range chunk identifier included in the received range information associated with a portion of an object to a current range chunk identifier corresponding to the portion of the object. A mismatched range exists for a portion of an object when the range chunk identifier included in the received range information associated with the portion of the object does not match the current range chunk identifier corresponding to the portion of the object. For example, the received range information may indicate that a portion of the object associated with 256 kb to 512 kb is associated with the range chunk identifier C123. However, the backup agent may determine that there is a mismatched range because the current range chunk identifier for the data included in the range of 256 kb to 512 kb is C456.

For each of the one or more determined ranges, the backup agent chunks the data into a plurality of variable-length data chunks, generates a plurality of corresponding data chunk identifiers, and provides the plurality of corresponding data chunk identifiers to the storage system. In some embodiments, the backup agent compares the plurality of generated data chunk identifiers to the one or more data chunk identifiers corresponding to the one or more data chunks associated with the one or more determined ranges included in the received range information and provides one or more corresponding data chunk identifiers not included in the received range information.

In response, the file system manager of the storage system compares the received data chunk identifiers to data chunk identifiers included in the chunk metadata data structure to identify one or more of the plurality of variable-length data chunks that are not stored in a storage associated with the storage system. The storage system provides to the source system a response that identifies among the plurality of variable-length data chunks, one or more variable-length data chunks not already stored in the storage associated with the storage system. In some embodiments, the response identifies the one or more data chunk identifiers corresponding to variable-length data chunks not already stored in the storage associated with the storage system. In some embodiments, the response identifies the one or more data chunk identifiers corresponding to variable-length data chunks already stored in the storage associated with the storage system. In response, the source system may eliminate the one or more variable-length data chunks corresponding to the one or more identified data chunk identifiers. Subsequently, the source system provides content of the one or more variable-length data chunks not already stored in the storage associated with the storage system. The storage system receives and stores the content of the one or more variable-length data chunks not already stored in the storage associated with the storage system.

The amount of resources needed by the source system to back up the data associated with one or more objects from the source system to the storage system is reduced because variable-length data chunks are generated for a subset of the data associated with the one or more objects instead of being generated for all of the data associated with the one or more objects. Also, the amount of data transmitted between the source system and the storage system is reduced because variable-length data chunks are transmitted for a subset of the data associated with the one or more objects instead of being transmitted for all of the data associated with the one or more objects.

In a second technique, a backup agent of the source system chunks data associated with one or more objects to be backed up into fixed-sized data chunks (e.g., 256 kb-512 kb sized data chunks). In some embodiments, a full backup of an object is to be performed. In some embodiments, an incremental backup of the object is to be performed. The backup agent generates a corresponding range chunk identifier for each of the fixed-sized data chunks and provides the range chunk identifiers to the storage system.

In response to receiving the range chunk identifiers associated with the plurality of fixed-sized data chunks of the one or more objects, the storage system determines whether any of the received range chunk identifiers match a range chunk identifier stored in the brick metadata data structure. The storage system provides to the source system a first response that is used to identify one or more range chunk identifiers corresponding to a subset of the plurality of range chunk identifiers. In some embodiments, the first response identifies one or more of the received range chunk identifiers that do not match a range chunk identifier stored in the brick metadata data structure. In some embodiments, the first response identifies one or more of the received range chunk identifiers that match a range chunk identifier stored in the brick metadata data structure. In response, the source system may eliminate one or more fixed-sized data chunks corresponding to the one or more identified range chunk identifiers included in the first response.

The source system utilizes the first response to identify among the plurality of fixed-sized data chunks of the one or more objects, one or more range chunk identifiers corresponding to the subset of the plurality of fixed-sized data chunks of the one or more objects. The source system chunks the content of the one or more fixed-sized data chunks included in the subset into a plurality of variable-length data chunks (e.g., 8 kb-16 kb sized data chunks) and generates a corresponding data chunk identifier (e.g., SHA-1 hash value) for each of the plurality of variable-length data chunks. The source system provides to the storage system the data chunk identifiers associated with the plurality of variable-length data chunks for the content of the one or more fixed-sized data chunks included in the subset.

In response to receiving the data chunk identifiers corresponding to the plurality of variable-length data chunks, the storage system determines whether any of the data chunk identifiers corresponding to the plurality of variable-length data chunks match a data chunk identifier stored in the chunk metadata data structure. The storage system provides a second response that identifies among the plurality of variable-size data chunks, one or more data chunk identifiers associated with one or more variable-length data chunks not already stored in the storage associated with the storage system. In response to receiving the second response, the source system provides content associated with the one or more identified variable-length data chunks.

The fixed-sized data chunks generated by the source system are significantly larger in size than the variable-length data chunks. As a result, the amount of resources needed by the source system to back up the data associated with one or more objects from the source system to the storage system is reduced because the source system is using less CPU resources to chunk the data associated with the one or more objects. The amount of resources needed by the source system to back up the data associated with one or more objects from the source system to the storage system is also reduced because variable-length data chunks are generated for a subset of the data associated with the one or more objects instead of being generated for all of the data associated with the one or more objects. Furthermore, the amount of data transmitted between the source system and the storage system is reduced because variable-length data chunks are transmitted for a subset of the data associated with the one or more objects instead of being transmitted for all of the data associated with the one or more objects.

In a third technique, a storage system determines that a backup of one or more objects associated with a source system is to be performed. A scheduler of the storage system provides to the file system manager of the storage system a corresponding object identifier for each of the one or more objects. The file system manager utilizes the corresponding object identifier to determine corresponding range information associated with the one or more objects. The storage system provides the corresponding range information for the one or more objects to the source system. The source system determines one or more missing ranges and/or one or more new ranges associated with the new objects based on the received range information. The source system may provide to the storage system content associated with the one or more determined missing and/or mismatched ranges. In response, the storage system ingests the content associated with the one or more determined missing and/or mismatched ranges. In some embodiments, the storage system performs in-line deduplication on the ingested data. In some embodiments, the storage system stores the ingested data and performs post-processing deduplication on the stored data. In some embodiments, the storage system performs partial in-line deduplication and partial post-processing deduplication on the ingested data. An example of a partial in-line deduplication and partial post-processing deduplication process is described in U.S. patent application Ser. No. 17/410,745 entitled "PARTIAL IN-LINE DEDUPLICATION AND PARTIAL POST-PROCESSING DEDUPLICATION OF DATA CHUNKS," filed on Aug. 24, 2021, the entire contents of which are incorporated by reference for all purposes. When compared with the first technique, the third technique reduces the amount of CPU resources utilized by the backup agent to perform source side deduplication because the backup agent does not need to chunk the data and generate chunk identifiers, but the amount of data that is transmitted between the source system and the storage system is increased. As a result, the overall time to perform a backup is more influenced by the amount of available network bandwidth between the source system and the storage system. However, using the third technique to back up data associated with one or more source system objects may be less when compared with a backup technique of merely chunking the backup data into variable-length data chunks, generating corresponding data chunk identifiers for the variable-length data chunks, and sending the corresponding data chunk identifiers to the storage system.

FIG. 1 is a block diagram illustrating an embodiment of a system for performing source side deduplication. In the example shown, system 100 includes a source system 102 and a storage system 112. Source system 102 is coupled to storage system 112 via connection 110. Connection 110 may be a wired or wireless connection. Connection 110 may be a LAN, WAN, intranet, the Internet, and/or a combination thereof.

Source system 102 is a computing system that stores file system data. The file system data may include a plurality of files (e.g., content files, text files, etc.) and metadata associated with the plurality of files. Source system 102 may be comprised of one or more servers, one or more computing devices, one or more storage devices, and/or a combination thereof. A backup of source system 102 may be performed according to one or more backup policies. In some embodiments, a backup policy indicates that file system data is to be backed up on a periodic basis (e.g., hourly, daily, weekly, monthly, etc.), when a threshold size of data has changed, or in response to a command from a user associated with source system 102.

Source system 102 may be configured to run one or more objects 103. Examples of objects include, but are not limited to, a virtual machine, a database, an application, a container, a pod, etc. Source system 102 may include one or more storage volumes (not shown) that are configured to store file system data associated with source system 102. The file system data associated with source system 102 includes the data associated with the one or more objects 103. In some embodiments, an object may refer to a file.

Backup agent 104 may be configured to cause source system 102 to perform a backup (e.g., a full backup or incremental backup). A full backup may include all of the file system data of source system 102 at a particular moment in time. In some embodiments, a full backup for a particular object of the one or more objects 103 is performed and the full backup of the particular object includes all of the object data associated with the particular object at a particular moment in time. In some embodiments, a full backup of the particular object is performed after a threshold number of incremental backups of the particular object have been performed. In some embodiments, a full backup of the particular object is an initial backup of the particular object. An incremental backup may include all of the file system data of source system 102 that has not been backed up since a previous backup. In some embodiments, an incremental backup for a particular object of the one or more objects 103 is performed and the incremental backup of the particular object includes all of the object data associated with the particular object that has not been backed up since a previous backup.

In some embodiments, backup agent 104 is running on source system 102. In some embodiments, backup agent 104 is running in one of the one or more objects 103. In some embodiments, a backup agent 104 is running on source system 102 and a separate backup agent 104 is running in one of the one or more object 103. In some embodiments, an object includes a backup function and is configured to perform a backup on its own without backup agent 104. In some embodiments, source system 102 includes a backup function and is configured to perform a backup on its own without backup agent 104. In some embodiments, storage system 112 may provide instructions to source system 102, causing source system 102 to execute backup functions without the backup agent 104.

Storage system 112 is comprised of a storage cluster that includes a plurality of storage nodes 111, 113, 115. Although three storage nodes are shown, storage system 112 may be comprised of n storage nodes.

In some embodiments, the storage nodes are homogenous nodes where each storage node has the same capabilities (e.g., processing, storage, memory, etc.). In some embodiments, at least one of the storage nodes is a heterogeneous node with different capabilities (e.g., processing, storage, memory, etc.) than the other storage nodes of storage system 112.

In some embodiments, a storage node of storage system 112 includes a processor, memory, and a plurality of storage devices. The plurality of storage devices may include one or more solid state drives, one or more hard disk drives, or a combination thereof.

In some embodiments, a storage node of storage system 112 includes a processor and memory, and is coupled to a separate storage device. The separate storage device may include one or more storage devices (e.g., flash storage devices). A storage device may be segmented into a plurality of partitions. Each of the storage nodes 111, 113, 115 may be allocated one or more of the partitions. The one or more partitions allocated to a storage node may be configured to store data associated with some or all of the plurality of objects that were backed up to storage system 112. For example, the separate storage device may be segmented into 10 partitions and storage system 112 may include 10 storage nodes. A storage node of the 10 storage nodes may be allocated one of the 10 partitions.

In some embodiments, a storage node of storage system 112 includes a processor, memory, and a storage device. The storage node may be coupled to a separate storage device. The separate storage device may include one or more storage devices. A storage device may be segmented into a plurality of partitions. Each of the storage nodes 111, 113, 115 may be allocated one or more of the partitions. The one or more partitions allocated to a storage node may be configured to store data associated with some or all of the plurality of objects that were backed up to storage system 112. For example, the separate storage device may be segmented into 10 partitions and storage system 112 may include 10 storage nodes. A storage node of the 10 storage nodes may be allocated one of the 10 partitions.

Storage system 112 may be a cloud instantiation of a storage system. A configuration of a cloud instantiation of storage system 112 may be a virtual replica of a storage system. For example, a storage system may be comprised of three storage nodes, each storage node with a storage capacity of 10 TB. A cloud instantiation of the storage system may be comprised of three virtual nodes, each virtual node with a storage capacity of 10 TB. In other embodiments, a cloud instantiation of a storage system may have more storage capacity than an on-premises instantiation of a storage system. In other embodiments, a cloud instantiation of a storage system may have less storage capacity than an on-premises instantiation of a storage system.

Storage system 112 includes a file system manager 117 that is configured to organize the file system data of the backup using a tree data structure. An example of the tree data structure is a snapshot tree, which may be based on a B+ tree structure (or other type of tree structure in other embodiments). Storage system 112 may store a plurality of tree data structures in metadata store 114, which is accessible by storage nodes 111, 113, 115. Metadata store 114 may be stored in one or more memories of the storage nodes 111, 113, 115. Storage system 112 may generate a snapshot tree and one or more metadata structures for each backup.

In the event the backup corresponds to all of the file system data of source system 102, a view corresponding to the backup may be comprised of a snapshot tree and one or more object metadata structures. The snapshot tree may be configured to store the metadata associated with source system 102. An object metadata structure may be configured to store the metadata associated with one of the one or more objects 103. Each of the one or more objects 103 may have a corresponding metadata structure.

In the event the backup corresponds to all of the object data of one of the one or more objects 103 (e.g., a backup of a virtual machine), a view corresponding to the backup may be comprised of a snapshot tree and one or more object file metadata structures. The snapshot tree may be configured to store the metadata associated with one of the one or more objects 103. An object file metadata structure may be configured to store the metadata associated with an object file included in the object.

The tree data structure may be used to capture different views of data. A view of data may correspond to a full backup, an incremental backup, a clone of data, a file, a replica of a backup, a backup of an object, a replica of an object, a tiered object, a tiered file, etc. The tree data structure allows a chain of snapshot trees to be linked together by allowing a node of a later version of a snapshot tree to reference a node of a previous version of a snapshot tree. For example, a root node or an intermediate node of a snapshot tree corresponding to a second backup may reference an intermediate node or leaf node of a snapshot tree corresponding to a first backup.

A snapshot tree is a representation of a fully hydrated restoration point because it provides a complete view of source system 102, an object 103, or data generated on or by the storage system 112 at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 112 maintains fully hydrated restoration points. Any file associated with source system 102, an object at a particular time and the file's contents, or a file generated on or by storage system 112, for which there is an associated reference restoration point, may be determined from the snapshot tree, regardless if the associated reference restoration was a full reference restoration point or an intermediate reference restoration point.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a metadata structure (e.g., object metadata structure or an object file metadata structure), a pointer to a data chunk stored on the storage cluster, etc.

A metadata structure (e.g., object file metadata structure, object metadata structure, file metadata structure) may include a root node, one or more levels of one or more intermediate nodes associated with the root node, and one or more leaf nodes associated with an intermediate node of the lowest intermediate level. The tree data structure associated with a metadata structure allows a chain of metadata structures corresponding to different versions of an object, an object file, or a file to be linked together by allowing a node of a later version of a metadata structure to reference a node of a previous version of a metadata structure. A leaf node of a metadata structure may store information, such as an identifier of a data brick associated with one or more data chunks and information associated with the one or more data chunks.

Storage system 112 maintains metadata that is stored in metadata store 114, such as a chunk metadata data structure, a chunk file metadata data structure, and a brick data structure. The chunk metadata data structure is comprised of a plurality of entries. Each entry associates a data chunk identifier corresponding to a data chunk with a chunk file identifier corresponding to a chunk file storing the data chunk. The chunk file metadata data structure is comprised of a plurality of entries. Each entry associates a chunk file identifier corresponding to a chunk file with one or more data chunk identifiers corresponding to one or more data chunks. This indicates the one or more data chunks that are stored in the chunk file having the chunk file identifier. Storage system 112 may store a plurality of chunk files for one or more storage tenants. The data stored by storage system 112 may be deduplicated across the one or more storage tenants.

The tree data structure includes a plurality of nodes that are associated with corresponding data bricks. A data brick is associated with one or more data chunks. A size of a fixed-sized data chunk may be the same size as a data brick, e.g., a size of a data brick is 256 kb, 512 kb, etc. The one or more data chunks associated with the data brick may each have a size of 8 kb-16 kb. The brick metadata data structure is comprised of a plurality of entries. Each entry corresponds to a data brick and associates a brick identifier corresponding to the data brick with a range chunk identifier corresponding to the one or more data chunks associated with the data brick.

In a first technique, scheduler 116 determines a backup (e.g., full backup or incremental backup) of one or more objects 103 is to be performed. Scheduler 116 provides to file system manager 117 a corresponding object identifier for each of the one or more objects 103 to be backed up. File system manager 117 utilizes the corresponding object identifier to determine corresponding range information associated with the one or more objects 103. Range information for an object includes one or more range chunk identifiers, a corresponding offset for each of the one or more range chunk identifiers, and a corresponding length for the one or more data chunks associated with a range chunk identifier for each of the one or more range chunk identifiers. In some embodiments, the range information for an object includes one or more data chunk identifiers corresponding to the one or more data chunks associated with a range chunk identifier for each of the one or more range chunk identifiers. Storage system 112 provides the corresponding range information for the one or more objects 103 to source system 102.

In response to receiving the corresponding range information for the one or more objects 103, backup agent 104 determines whether there are one or more missing ranges and/or one or more mismatched ranges associated with the one or more objects 103 based on the corresponding range information. A missing range corresponds to a portion of an object that was not previously backed up. For example, there may have been data appended to the object since the previous backup. Backup agent 104 may determine that there is a missing range in response to a determination that the received range information does not cover the missing range.

In some embodiments, a mismatched range corresponds to a portion of an object that was overwritten with new data since the previous backup. In some embodiments, a mismatched range corresponds to a portion of an object where data was inserted into the range since the previous backup. Backup agent 104 may determine that a mismatched range exists by comparing the range chunk identifier included in the received range information associated with a portion of an object to a current range chunk identifier corresponding to the portion of the object. A mismatched range exists for a portion of an object when the range chunk identifier included in the received range information associated with the portion of the object does not match the current range chunk identifier corresponding to the portion of the object. For example, the received range information may indicate that a portion of the object associated with 256 kb to 512 kb is associated with the range chunk identifier C123. However, backup agent 104 may determine that there is a mismatched range because the current range chunk identifier for the data included in the range of 256 kb to 512 kb is C456.

For each of the one or more determined ranges, backup agent 104 chunks the data into a plurality of variable-length data chunks, generates a plurality of corresponding data chunk identifiers, and provides the plurality of corresponding data chunk identifiers to storage system 112. In some embodiments, backup agent 104 compares the plurality of generated data chunk identifiers to the one or more data chunk identifiers corresponding to the one or more data chunks associated with the one or more determined ranges included in the received range information and provides one or more corresponding data chunk identifiers not included in the received range information.

In response, file system manager 117 compares the received data chunk identifiers to data chunk identifiers included in the chunk metadata data structure stored in metadata store 114 to identify one or more of the plurality of variable-length data chunks that are not stored by storage system 112. Storage system 112 provides to source system 102 a response that identifies among the plurality of variable-size data chunks, one or more variable-length data chunks not already stored in the storage associated with storage system 112. In some embodiments, the response identifies the one or more data chunk identifiers corresponding to variable-length data chunks not already stored in the storage associated with storage system 112. In some embodiments, the response identifies the one or more data chunk identifiers corresponding to variable-length data chunks already stored in the storage associated with storage system 112. In response, source system 102 may eliminate the one or more variable-length data chunks corresponding to the one or more identified data chunk identifiers. Subsequently, source system 102 provides content of the one or more variable-length data chunks not already stored in the storage associated with the storage system 112. Storage system 112 receives and stores the content of the one or more variable-length data chunks not already stored in the storage associated with storage system 112.

In a second technique, backup agent 104 chunks data associated with one or more objects to be backed up into fixed-sized data chunks (e.g., 256 kb-512 kb sized data chunks). Backup agent 104 generates a corresponding range chunk identifier for each of the fixed-sized data chunks and provides the range chunk identifiers to the storage system.

In response to receiving the range chunk identifiers associated with the plurality of fixed-sized data chunks of the one or more objects, file system manager 117 determines whether any of the received range chunk identifiers match a range chunk identifier stored in the brick metadata data structure. File system manager 117 provides to backup agent 104 a first response that is used to identify one or more range chunk identifiers corresponding to a subset of the plurality of range chunk identifiers. In some embodiments, the first response identifies one or more of the received range chunk identifiers that do not match a range chunk identifier stored in the brick metadata data structure. In some embodiments, the first response identifies one or more of the received range chunk identifiers that match a range chunk identifier stored in the brick metadata data structure.

Backup agent 104 utilizes the first response to identify among the plurality of fixed-sized data chunks of the one or more objects, one or more range chunk identifiers corresponding to a subset of the plurality of fixed-sized data chunks of the one or more objects. Backup agent 104 chunks the content of the one or more fixed-sized data chunks included in the subset into a plurality of variable-length data chunks (e.g., 8 kb-16 kb sized data chunks) and generates a corresponding data chunk identifier for each of the plurality of variable-length data chunks. Backup agent 104 provides to storage system 112 the data chunk identifiers associated with the plurality of variable-length data chunks for the content of the one or more fixed-sized data chunks corresponding to the one or more identified range chunk identifiers.

In response to receiving the data chunk identifiers corresponding to the plurality of variable-length data chunks, file system manager 117 determines whether any of the data chunk identifiers corresponding to the plurality of variable-length data chunks match a data chunk identifier stored in the chunk metadata data structure. File system manager 117 provides to backup agent 104 a second response that identifies among the plurality of variable-size data chunks, one or more data chunk identifiers associated with one or more variable-length data chunks not already stored in the storage associated with storage system 112. In response to receiving the second response, the backup agent 104 provides the one or more identified variable-length data chunks.

In a third technique, storage system 112 determines that a backup of one or more objects associated with source system 102 is to be performed. Scheduler 116 provides to file system manager 117 a corresponding object identifier for each of the one or more objects. File system manager 117 utilizes the corresponding object identifier to determine corresponding range information associated with the one or more objects. Storage system 112 provides the corresponding range information for the one or more objects to source system 102. Source system 102 determines one or more missing ranges and/or one or more new ranges associated with the new objects based on the received range information. Source system 102 may provide to storage system 112 content associated with the one or more determined missing and/or mismatched ranges. In response, storage system 112 ingests the content associated with the one or more determined missing and/or mismatched ranges. In some embodiments, storage system 112 performs in-line deduplication on the ingested data. In some embodiments, storage system 112 stores the ingested data and performs post-processing deduplication on the stored data. In some embodiments, storage system 112 performs partial in-line deduplication and partial post-processing deduplication on the ingested data.

FIG. 2A is a flow diagram illustrating a process for reducing the amount of data received from a source system during a backup in accordance with some embodiments. In the example shown, process 200 is implemented by a storage system, such as storage system 112.

At 202, a backup of one or more objects associated with a source system is determined to be performed. A storage system includes a scheduler. The scheduler may determine that a backup of the one or more objects associated with the source system is to be performed according to one or more backup policies. In some embodiments, a backup policy indicates that the one or more objects are to be backed up on a periodic basis (e.g., hourly, daily, weekly, monthly, etc.), in response to a command from a user, etc. In some embodiments, a full backup of the one or more objects associated with the source system is determined to be performed. In some embodiments, an incremental backup of the one or more objects associated with the source system is determined to be performed.

At 204, range information associated with the one or more objects is determined. The storage system includes a file system manager. The scheduler provides to the file system manager a corresponding object identifier for each of the one or more objects. The file system manager utilizes the corresponding object identifier to determine corresponding range information associated with the one or more objects. Range information for an object includes one or more range chunk identifiers, a corresponding offset for each of the one or more range chunk identifiers, and a corresponding length for the one or more data chunks associated with a range chunk identifier for each of the one or more range chunk identifiers. Each range chunk identifier corresponds to a particular range of an object and represents one or more data chunks included in the particular range of the object. In some embodiments, the range information for an object includes one or more data chunk identifiers corresponding to the one or more data chunks associated with a range chunk identifier for each of the one or more range chunk identifiers.

At 206, the range information associated with the one or more objects is provided to a source system.

At 208, one or more data chunk identifiers corresponding to one or more variable-length data chunks are received. The source system includes a backup agent. In response to receiving the corresponding range information for the one or more objects to the source system, the backup agent determines whether there are one or more missing ranges and/or one or more mismatched ranges associated with the one or more objects based on the corresponding range information.

For each of the one or more determined ranges, the backup agent chunks the data into a plurality of variable-length data chunks, generates a plurality of corresponding data chunk identifiers, and provides the storage system the plurality of corresponding data chunk identifiers to the storage system. In some embodiments, the backup agent compares the plurality of generated data chunk identifiers to the one or more data chunk identifiers corresponding to the one or more data chunks associated with the one or more determined ranges included in the received range information and provides one or more corresponding data chunk identifiers not included in the received range information.

At 210, it is determined whether any of the one or more data chunk identifiers are stored in a chunk metadata data structure. The backup agent may determine that a mismatched range exists by comparing the range chunk identifier included in the provided range information associated with a portion of an object to a current range chunk identifier corresponding to the portion of the object. For each of the one or more determined ranges, the backup agent chunks the data into a plurality of variable-length data chunks, generates a plurality of corresponding data chunk identifiers, and provides the plurality of corresponding data chunk identifiers to the storage system.

In response, the file system manager of the storage system compares the received data chunk identifiers to data chunk identifiers included in the chunk metadata data structure to identify one or more of the plurality of variable-length data chunks that are not stored in a storage associated with the storage system.

At 212, a response is provided. The response identifies among the plurality of variable-length data chunks, one or more variable-length data chunks not already stored in the storage associated with the storage system. In some embodiments, the response identifies the one or more data chunk identifiers corresponding to variable-length data chunks not already stored in the storage associated with the storage system. In some embodiments, the response identifies the one or more data chunk identifiers corresponding to variable-length data chunks already stored in the storage associated with the storage system.

At 214, content of the one or more variable-length data chunks not already stored in the storage associated with the storage system is received and stored.

FIG. 2B is a flow diagram illustrating a process for performing source side deduplication in accordance with some embodiments. In the example shown, process 250 is implemented by a source system, such as source system 102.

At 252, range information associated with one or more objects is received. Range information for an object includes one or more range chunk identifiers, a corresponding offset for each of the one or more range chunk identifiers, and a corresponding length for the one or more data chunks associated with a range chunk identifier for each of the one or more range chunk identifiers. Each range chunk identifier corresponds to a particular range of an object and represents one or more data chunks included in the particular range of the object. In some embodiments, the range information for an object includes one or more data chunk identifiers corresponding to the one or more data chunks associated with a range chunk identifier for each of the one or more range chunk identifiers.

At 254, one or more missing ranges and/or one or more mismatched ranges associated with the one or more objects are determined based on the received range information. A missing range corresponds to a portion of an object that was not previously backed up. For example, there may have been data appended to the object since the previous backup. The backup agent may determine that there is a missing range in response to a determination that the received range information does not cover the missing range.

In some embodiments, a mismatched range corresponds to a portion of an object that was overwritten with new data since the previous backup. In some embodiments, a mismatched range corresponds to a portion of an object where data was inserted into the range since the previous backup. The backup agent may determine that a mismatched range exists by comparing the range chunk identifier included in the received range information associated with a portion of an object to a current range chunk identifier corresponding to the portion of the object. For example, the received range information may indicate that a portion of the object associated with 256 kb to 512 kb is associated with the brick identifier C123. However, the backup agent may determine that there is a mismatched range because the current range chunk identifier for the data included in the range of 256 kb to 512 kb is C456.

At 256, content associated with the one or more determined ranges is chunked into a plurality of variable-length data chunks.

At 258, a corresponding data chunk identifier is generated for each of the variable-length data chunks.

At 260, the data chunk identifiers are provided to a storage system. In some embodiments, the source system compares the plurality of generated chunk identifiers to the one or more chunk identifiers corresponding to the one or more data chunks associated with the one or more determined ranges included in the received range information and provides to the storage system one or more corresponding chunk identifiers not included in the received range information.

At 262, a response is received. The response identifies among the plurality of variable-length data chunks generated at 256, one or more variable-length data chunks not already stored in the storage associated with the storage system. In some embodiments, the response identifies the one or more data chunk identifiers corresponding to variable-length data chunks not already stored in the storage associated with the storage system. In some embodiments, the response identifies the one or more data chunk identifiers corresponding to variable-length data chunks already stored in the storage associated with the storage system. In response, the source system may eliminate the one or more variable-length data chunks corresponding to the one or more identified data chunk identifiers.

At 264, content of one or more variable-length data chunks not already stored in a storage associated with the storage system is provided to the storage system.

FIG. 3A is a flow diagram illustrating a process for performing source side deduplication in accordance with some embodiments. In the example shown, process 300 is implemented by a source system, such as source system 102.

At 302, data associated with one or more objects to be backed up are chunked into a plurality of fixed-sized data chunks.

At 304, a corresponding range chunk identifier is generated for each of the fixed-sized data chunks. The corresponding range chunk identifier corresponds to a particular range of an object and represents one or more data chunks included in the particular range of the object.

At 306, a first plurality of range chunk identifiers associated with the plurality of fixed-sized data chunks of the one or more objects is provided to a storage system. The storage system maintains a brick metadata data structure. Each entry of the brick metadata data structure corresponds to a data brick and associates a brick identifier corresponding to the data brick with a range chunk identifier corresponding to the one or more data chunks associated with the data brick. In response to receiving the range chunk identifiers associated with the plurality of fixed-sized data chunks of the one or more objects, the storage system determines whether any of the received range chunk identifiers match a range chunk identifier stored in the brick metadata data structure.

At 308, a first response that is used to identify among the plurality of fixed-sized data chunks, one or more range chunk identifiers corresponding to a subset of the plurality of range chunk identifiers is received. In some embodiments, the first response identifies one or more range chunk identifiers associated with the plurality of fixed-sized data chunks included in the subset (e.g., stored in the brick metadata data structure). In some embodiments, the first response identifies one or more range chunk identifiers associated with the plurality of fixed-sized data chunks not included in the subset (e.g., not stored in the brick metadata data structure). The source system may eliminate range chunk identifiers from the first plurality of range chunk identifiers based on the first response.

At 310, content for one or more fixed-sized data chunks corresponding to an identified range chunk identifier included in the subset is chunked into a plurality of variable-length data chunks (e.g., 8 kb-16 kb sized data chunks).

At 312, a corresponding data chunk identifier is generated for each of the variable-length data chunks (e.g., SHA-1 hash value).

At 314, a second plurality of data chunk identifiers corresponding to the variable-length data chunks for the content of the one or more fixed-sized data chunks included in the subset is provided to the storage system.

At 316, a second response that is used to identify among the plurality of variable-length data chunks, one or more variable-length data chunks not already stored in the storage associated with the storage system is received. In some embodiments, the second response includes one or more data chunk identifiers corresponding to the one or more variable-length data chunks not already stored in the storage associated with the storage system. In some embodiments, the second response includes one or more data chunk identifiers corresponding to the one or more variable-length data chunks already stored in the storage associated with the storage system. The storage system may eliminate data chunk identifiers from the second plurality of chunk identifiers based on the second response.

At 318, the content of the identified one or more variable-length data chunks is provided to the storage system.

FIG. 3B is a flow diagram illustrating a process for reducing the amount of data received from a source system during a backup in accordance with some embodiments. In the example shown, process 350 may be implemented by a storage system, such as storage system 112.

At 352, range chunk identifiers corresponding to a plurality of fixed-sized data chunks are received.

At 354, it is determined if any of the range chunk identifiers are stored in a brick metadata data structure. Each range chunk identifier included in the brick metadata data structure corresponds to a particular range of an object and represents one or more data chunks included in the particular range of the object.

At 356, a first response is provided. The first response may be used to identify one or more range chunk identifiers corresponding to a subset of the plurality of range chunk identifiers. In some embodiments, the first response identifies one or more of the received range chunk identifiers that do not match a range chunk identifier stored in the brick metadata data structure. In some embodiments, the first response identifies one or more of the received range chunk identifiers that match a range chunk identifier stored in the brick metadata data structure.

At 358, a plurality of data chunk identifiers corresponding to a plurality of variable-length data chunks is received. The source system utilizes the first response to identify among the plurality of fixed-sized data chunks of the one or more objects, one or more data chunk identifiers corresponding to the subset of the plurality of fixed-sized data chunks of the one or more objects. The source system chunks the content of the one or more fixed-sized data chunks included in the subset into a plurality of variable-length data chunks (e.g., 8 kb-16 kb sized data chunks) and generates a corresponding data chunk identifier for each of the plurality of variable-length data chunks. The source system provides to the storage system the data chunk identifiers associated with the plurality of variable-length data chunks for the content of the one or more fixed-sized data chunks included in the subset.

At 360, it is determined if any of the data chunk identifiers are stored in a chunk metadata data structure. In response to receiving the data chunk identifiers corresponding to the plurality of variable-length data chunks, the storage system determines whether any of the data chunk identifiers corresponding to the plurality of variable-length data chunks match a data chunk identifier stored in the chunk metadata data structure.

At 362, a second response is provided. The second response identifies among the plurality of variable-size data chunks, one or more data chunk identifiers associated with one or more variable-length data chunks not already stored in the storage associated with the storage system.

In some embodiments, the second response identifies the one or more data chunk identifiers corresponding to variable-length data chunks not already stored in the storage associated with the storage system. In some embodiments, the second response identifies the one or more data chunk identifiers corresponding to variable-length data chunks already stored in the storage associated with the storage system. In response, the source system may eliminate the one or more variable-length data chunks corresponding to the one or more identified data chunk identifiers.

At 364, content of one or more variable-length data chunks associated with the second response is received and stored. In response to receiving the second response, the source system provides the content of one or more variable-length data chunks associated with the second response.

Figure 4:
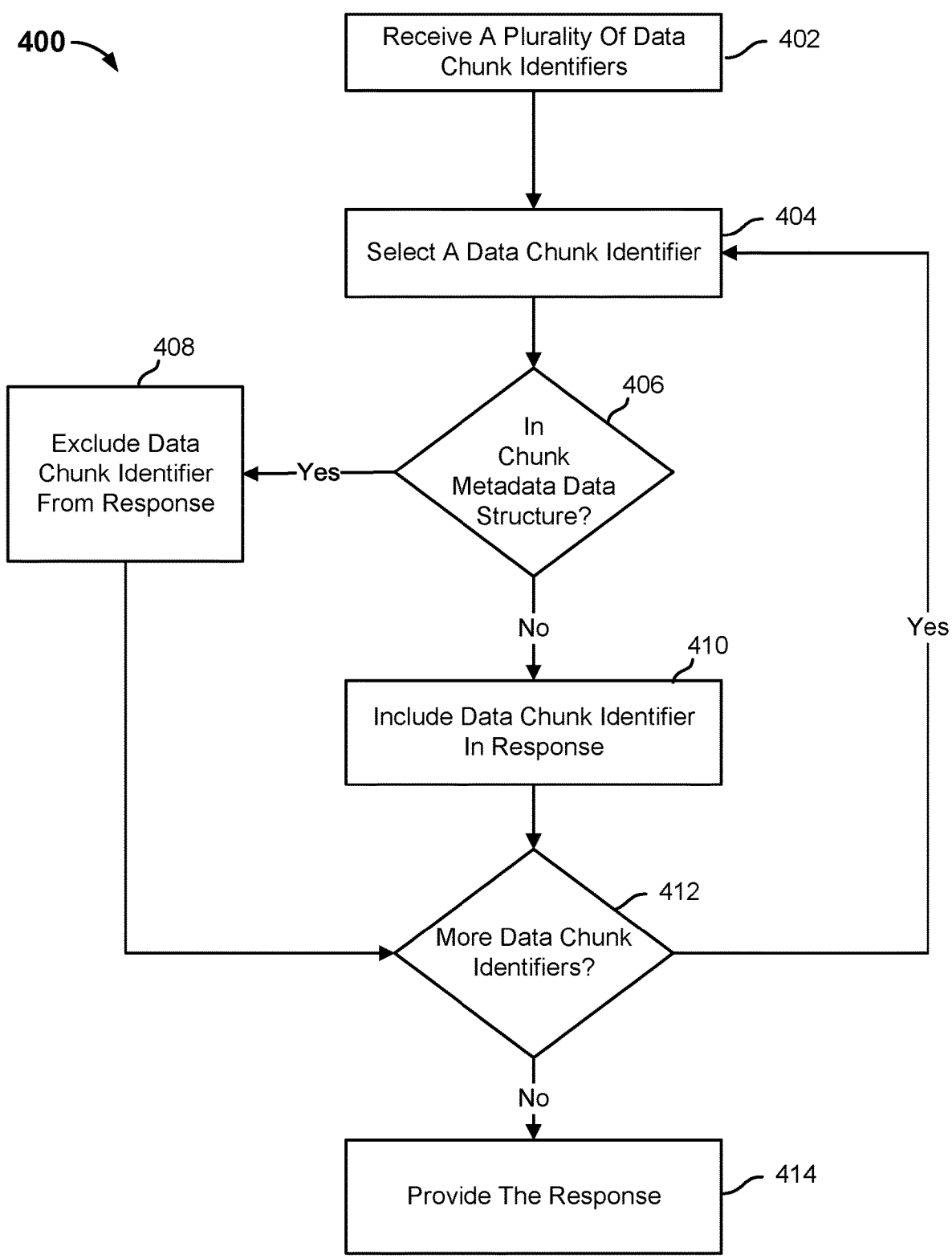
FIG. 4 is a flow diagram illustrating a process for identifying variable-length data chunks in accordance with some embodiments.

FIG. 4 is a flow diagram illustrating a process for identifying variable-length data chunks in accordance with some embodiments. In the example shown, process 400 may be implemented by a storage system, such as storage system 112.

At 402, a plurality of data chunk identifiers associated with a plurality of variable-length data chunks for the content of one or more identified fixed-sized data chunks is received.

At 404, a data chunk identifier is selected.

At 406, it is determined whether the data chunk identifier is included in an entry of a chunk metadata data structure. In response to a determination that the data chunk identifier is included in an entry of a chunk metadata data structure, process 400 proceeds to 408. In response to a determination that the data chunk identifier is not included in an entry of a chunk metadata data structure, process 400 proceeds to 410.

At 408, the data chunk identifier is excluded from a response.

At 410, the data chunk identifier is included in the response.

At 412, it is determined whether there are more data chunk identifiers included in the plurality of data chunk identifiers.

In response to a determination that there are more data chunk identifiers included in the received plurality of data chunk identifiers, process 400 returns to 404. In response to a determination that there are no more data chunk identifiers included in the received plurality of data chunk identifiers, process 400 proceeds to 414.

At 414, the response is provided. The response is used to identify among the plurality of variable-length data chunks of the one or more objects, one or more variable-length data chunks that are not already stored in a storage associated with the storage system.

Figure 5:
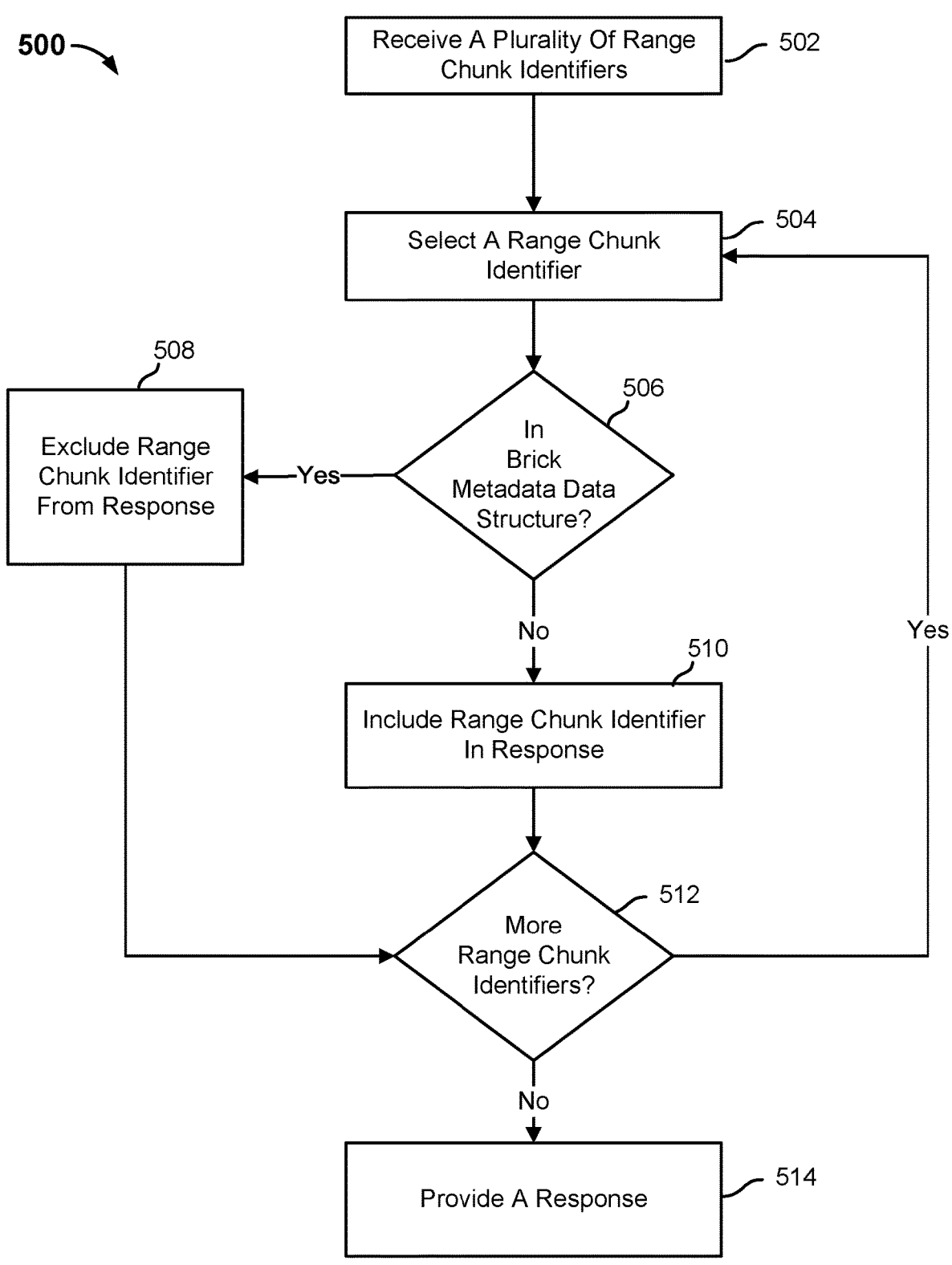
FIG. 5 is a flow diagram illustrating a process for identifying fixed-sized data chunks in accordance with some embodiments.

FIG. 5 is a flow diagram illustrating a process for identifying fixed-sized data chunks in accordance with some embodiments. In the example shown, process 500 may be implemented by a storage system, such as storage system 112.

At 502, a plurality of range chunk identifiers associated with a plurality of fixed-sized data chunks of one or more objects is received.

At 504, a range chunk identifier is selected.

At 506, it is determined whether the range chunk identifier is included in an entry of a brick metadata data structure. Each range chunk identifier included in the brick metadata data structure corresponds to a particular range of an object and represents one or more data chunks included in the particular range of the object. In response to a determination that the range chunk identifier is included in an entry of a brick metadata data structure, process 500 proceeds to 508. In response to a determination that the range chunk identifier is not included in an entry of a brick metadata data structure, process 500 proceeds to 510.

At 508, the range chunk identifier is excluded from a response.

At 510, the range chunk identifier is included in the response.

At 512, it is determined whether there are more range chunk identifiers included in the plurality of received range chunk identifiers.

In response to a determination that there are more range chunk identifiers included in the plurality of received range chunk identifiers, process 500 returns to 504. In response to a determination that there are no more range chunk identifiers included in the plurality of received chunk identifiers, process 500 proceeds to 514.

At 514, the response is provided. The response is used to identify among the plurality of fixed-sized data chunks of the one or more objects, one or more range chunk identifiers corresponding to one or more fixed-sized data chunks not already stored in a data structure stored in a storage associated with the storage system.

Figure 6A:
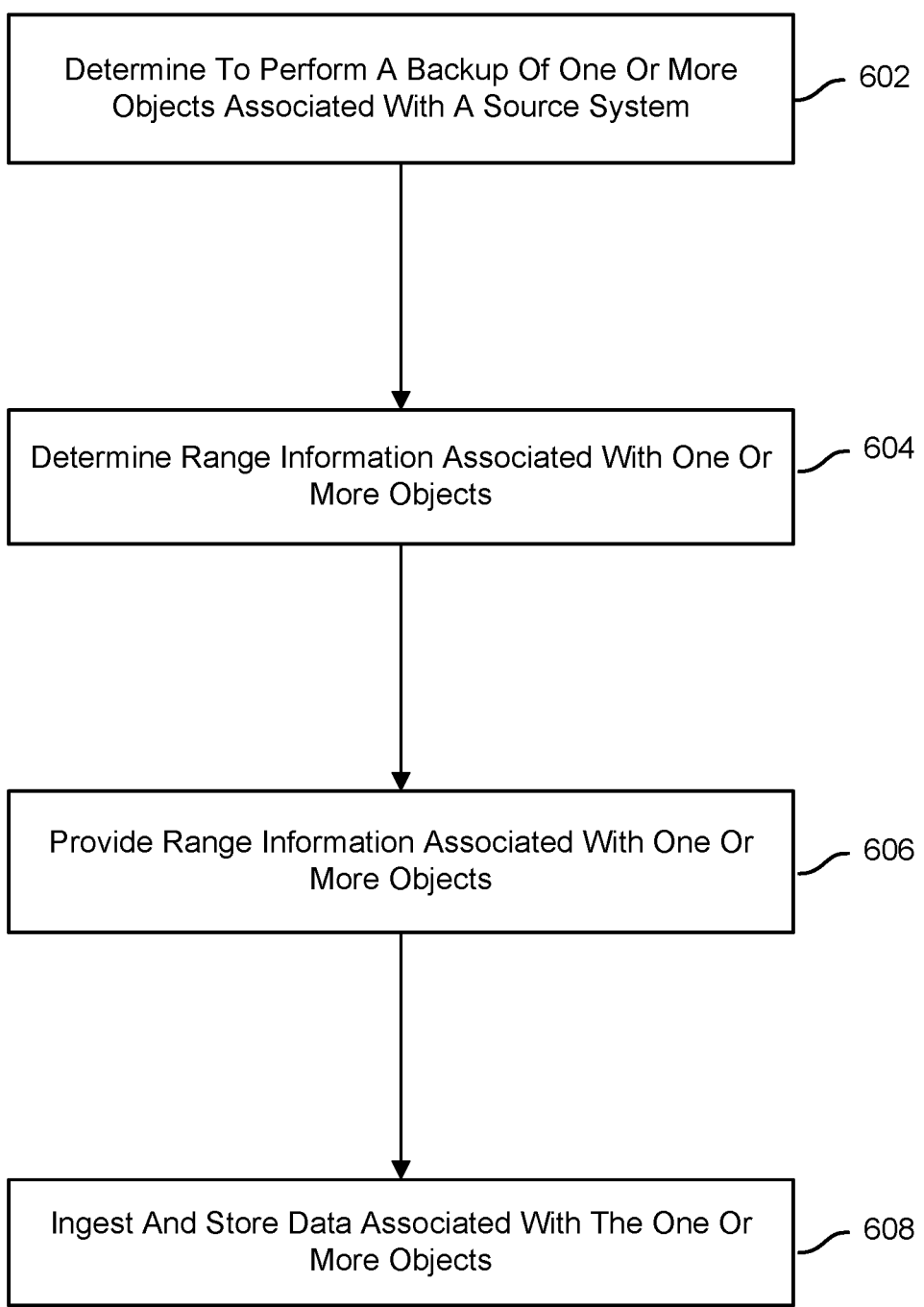
FIG. 6A is a flow diagram illustrating a process for reducing the amount of data received from a source system during a backup in accordance with some embodiments.

FIG. 6A is a flow diagram illustrating a process for reducing the amount of data received from a source system during a backup in accordance with some embodiments. In the example shown, process 600 is implemented by a storage system, such as storage system 112.

At 602, a backup of one or more objects associated with a source system is determined to be performed. A storage system includes a scheduler. The scheduler may determine that a backup of the one or more objects associated with the source system is to be performed according to one or more backup policies. In some embodiments, a backup policy indicates that the one or more objects are to be backed up on a periodic basis (e.g., hourly, daily, weekly, monthly, etc.), in response to a command from a user, etc. In some embodiments, a full backup of the one or more objects associated with the source system is determined to be performed. In some embodiments, an incremental backup of the one or more objects associated with the source system is determined to be performed.

At 604, range information associated with the one or more objects is determined. The storage system includes a file system manager. The scheduler provides to the file system manager a corresponding object identifier for each of the one or more objects. The file system manager utilizes the corresponding object identifier to determine corresponding range information associated with the one or more objects. Range information for an object includes one or more range chunk identifiers, a corresponding offset for each of the one or more range chunk identifiers, and a corresponding length for the one or more data chunks associated with a range chunk identifier for each of the one or more range chunk identifiers. In some embodiments, the range information for an object includes one or more data chunk identifiers corresponding to the one or more data chunks associated with a range chunk identifier for each of the one or more range chunk identifiers. The storage system provides the corresponding range information for the one or more objects to the source system.

At 606, the range information associated with the one or more objects is provided to a source system.

At 608, data associated with the one or more objects is ingested and stored. The source system determines one or more missing ranges and/or one or more new ranges associated with the new objects based on the received range information. A missing range corresponds to a portion of an object that was not previously backed up. For example, there may have been data appended to the object since the previous backup. A backup agent of the source system may determine that there is a missing range in response to a determination that the received range information does not cover the missing range.

In some embodiments, a mismatched range corresponds to a portion of an object that was overwritten with new data since the previous backup. In some embodiments, a mismatched range corresponds to a portion of an object where data was inserted into the range since the previous backup. The backup agent may determine that a mismatched range exists by comparing the range chunk identifier included in the received range information associated with a portion of an object to a current range chunk identifier corresponding to the portion of the object. For example, the received range information may indicate that a portion of the object associated with 256 kb to 512 kb is associated with the brick identifier C123. However, the backup agent may determine that there is a mismatched range because the current range chunk identifier for the data included in the range of 256 kb to 512 kb is C456.

The source system may provide to the storage system content associated with the one or more determined missing and/or mismatched ranges. In response, the storage system ingests the content associated with the one or more determined missing and/or mismatched ranges. In some embodiments, the storage system performs in-line deduplication on the ingested data. In some embodiments, the storage system stores the ingested data and performs post-processing deduplication on the stored data. In some embodiments, the storage system performs partial in-line deduplication and partial post-processing deduplication on the ingested data.

Figure 6B:
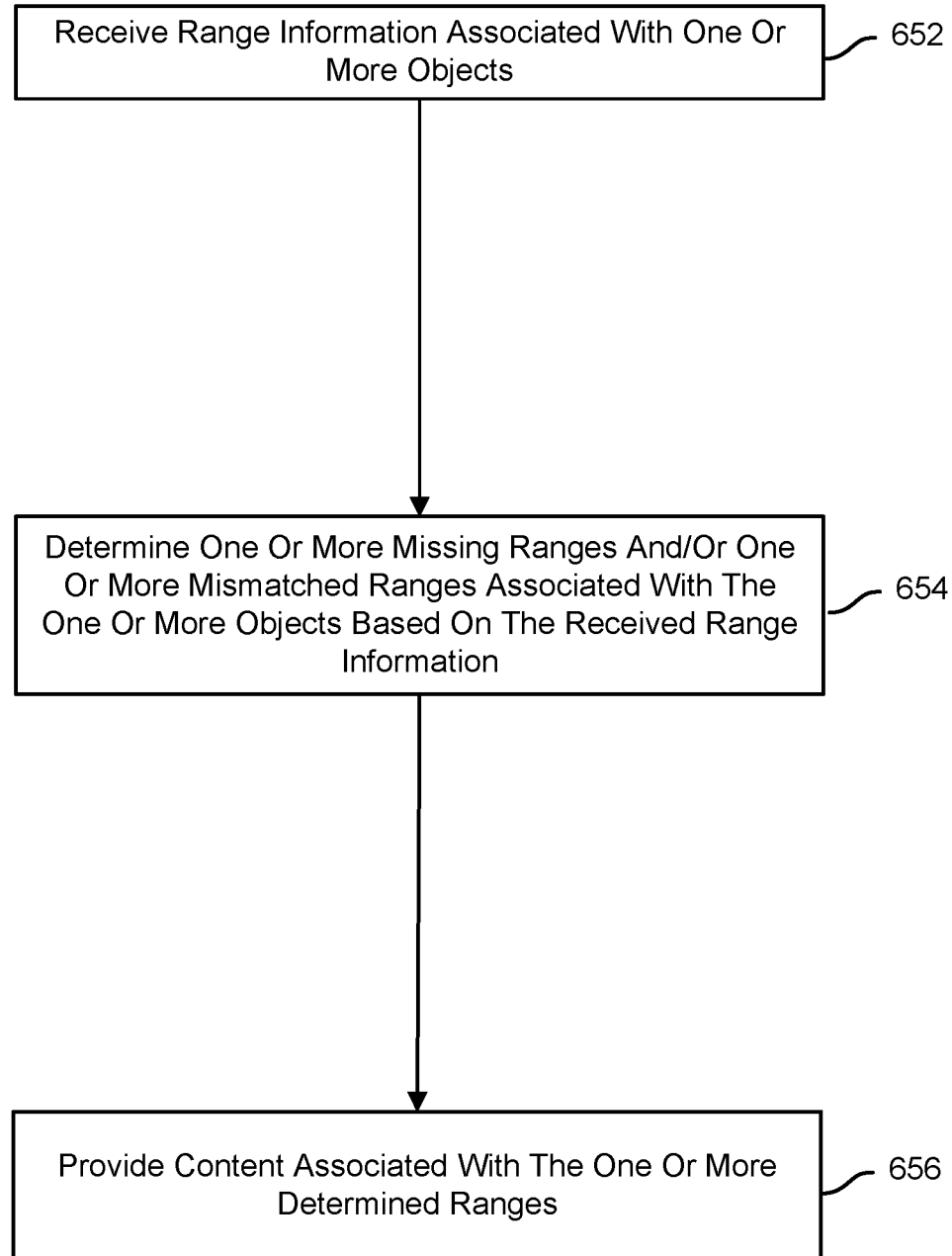
FIG. 6B is a flow diagram illustrating a process for performing source side deduplication in accordance with some embodiments.

FIG. 6B is a flow diagram illustrating a process for performing source side deduplication in accordance with some embodiments. In the example shown, process 650 is implemented by a source system, such as source system 102.

At 652, range information associated with one or more objects is received. Range information for an object includes one or more range chunk identifiers, a corresponding offset for each of the one or more range chunk identifiers, and a corresponding length for each of the one or more data chunks associated with the object. Each range chunk identifier corresponds to a particular range of an object and represents one or more data chunks included in the particular range of the object. In some embodiments, the range information for an object includes one or more data chunk identifiers associated with the one or more range chunk identifiers.

At 654, one or more missing ranges and/or one or more new ranges associated with the new objects is determined based on the received range information. A missing range corresponds to a portion of an object that was not previously backed up. For example, there may have been data appended to the object since the previous backup. The backup agent may determine that there is a missing range in response to a determination that the received range information does not cover the missing range.

At 654, one or more missing ranges and/or one or more mismatched ranges associated with the one or more objects are determined based on the received range information. A missing range corresponds to a portion of an object that was not previously backed up. For example, there may have been data appended to the object since the previous backup. The backup agent may determine that there is a missing range in response to a determination that the received range information does not cover the missing range.

In some embodiments, a mismatched range corresponds to a portion of an object that was overwritten with new data since the previous backup. In some embodiments, a mismatched range corresponds to a portion of an object where data was inserted into the range since the previous backup. The backup agent may determine that a mismatched range exists by comparing the range chunk identifier included in the received range information associated with a portion of an object to a current range chunk identifier corresponding to the portion of the object. For example, the received range information may indicate that a portion of the object associated with 256 kb to 512 kb is associated with the brick identifier C123. However, the backup agent may determine that there is a mismatched range because the current range chunk identifier for the data included in the range of 256 kb to 512 kb is C456.

At 656, content associated with the one or more determined ranges is provided.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving, by a backup agent executed at a source computing system and from a storage system separate from the source computing system, range information associated with one or more objects, the range information including a plurality of range chunk identifiers, wherein each of the plurality of range chunk identifiers identifies a corresponding range of chunks within a corresponding object of the one or more objects stored as one or more fixed-length data bricks, wherein each of the one or more fixed-length data bricks includes one or more variable-length data chunks identified in the range of chunks, and each of the fixed-length data bricks is associated with brick metadata that includes a respective one of the plurality of range chunk identifiers;

based on the plurality of range chunk identifiers included in the range information received from the storage system, determining, by the backup agent executed at the source computing system, one or more missing ranges or one or more mismatched ranges associated with the one or more objects, wherein:

determining the one or more mismatched ranges includes comparing a range chunk identifier from the plurality of range chunk identifiers that corresponds to a portion of the one or more objects to a current range chunk identifier that corresponds to the portion of the one or more objects, a mismatched range of the one or more mismatched ranges exists when the range chunk identifier identifies a different range of data chunks than a range of data chunks of the current range chunk identifier, and a missing range of the one or more missing ranges exists when the range information does not cover a range corresponding to the current range chunk identifier;

providing, by the backup agent executing at the source computing system and to the storage system, a plurality of data chunk identifiers associated with the one or more variable-length data chunks included in the at least one of the one or more missing ranges or the one or more mismatched ranges associated with the one or more objects;

receiving, by the backup agent executed at the source computing system and from the storage system, a response that is used to identify, among the plurality of variable-length data chunks, one or more variable-length data chunks not already stored in a storage associated with the storage system; and providing, by the backup agent executed at the source computing system and to the storage system, content of the one or more variable-length data chunks.

2. The method of claim 1, wherein each of the plurality of range chunk identifiers corresponds to a particular range of the corresponding object.

3. The method of claim 1, wherein the missing range of the one or more missing ranges corresponds to a portion of an object of the one or more objects that was not previously backed up.

4. The method of claim 1, wherein determining the one or more missing ranges associated with the one or more objects includes determining, by the backup agent executed at the source computing system, that the range information received from the storage system does not cover the range corresponding to the current range chunk identifier.

5. The method of claim 1, further comprising chunking, by the computing system, data associated with the one or more missing ranges or the one or more mismatched ranges into the plurality of variable-length data chunks.

6. The method of claim 1, further comprising generating, by the backup agent executed at the computing system, the plurality of data chunk identifiers associated with the plurality of variable-length data chunks.

7. The method of claim 1, wherein the storage system compares the plurality of data chunk identifiers associated with the plurality of variable-length chunks to a second plurality of data chunk identifiers included in a chunk metadata data structure that identifies a plurality of data chunks stored in the storage associated with the storage system.

8. The method of claim 7, wherein in response to a determination that a data chunk identifier associated with a variable-length data chunk is not included in the chunk metadata data structure, the storage system includes the data chunk identifier associated with the variable-length data chunk in the response.

9. The method of claim 8, wherein in response to a determination that a data chunk identifier associated with a variable-length data chunk is included in the chunk metadata data structure, the storage system excludes the data chunk identifier associated with the variable-length data chunk from the response.

10. Non-transitory computer readable media storing computer instructions that, when executed by a processor of a source computing system, cause the processor to execute a backup agent to:

receive, from a storage system, range information associated with one or more objects, the range information including a plurality of range chunk identifiers, wherein each of the plurality of range chunk identifiers identifies a corresponding range of chunks within a corresponding object of the one or more objects stored as one or more fixed-length data bricks, wherein each of the one or more fixed-length data bricks includes one or more variable-length data chunks identified in the range of chunks, and each of the fixed-length data bricks is associated with brick metadata that includes a respective one of the plurality of range chunk identifiers;

based on the plurality of range chunk identifiers included in the range information received from the storage system, determine at least one of one or more missing ranges or one or more mismatched ranges associated with the one or more objects, wherein:

determining the one or more mismatched ranges includes comparing a range chunk identifier from the plurality of range chunk identifiers that corresponds to a portion of the one or more objects to a current range chunk identifier that corresponds to the portion of the one or more objects, a mismatched range of the one or more mismatched ranges exists when the range chunk identifier identifies a different range of data chunks than a range of data chunks of the current range chunk identifier, and a missing range of the one or more missing ranges exists when the range information does not cover a range corresponding to the current range chunk identifier;

provide, to the storage system, a plurality of data chunk identifiers associated with the one or more variable-length data chunks included in the at least one of the one or more missing ranges or the one or more mismatched ranges associated with the one or more objects;

receive, from the storage system, a response that is used to identify, among the one or more of variable-length data chunks, one or more variable-length data chunks not already stored in a storage associated with the storage system; and provide, to the storage system, content of the one or more variable-length data chunks.

11. The non-transitory computer readable media of claim 10, wherein each of the plurality of range chunk identifiers corresponds to a particular range of the corresponding object.

12. The non-transitory computer readable media of claim 10, wherein to determine the one or more missing ranges associated with the one or more objects, the computer instructions cause the processor to determine that the range information received from the storage system does not cover the range corresponding to the current range chunk identifier.

13. The non-transitory computer readable media of claim 10, wherein the computer instructions cause the processor to chunk data associated with the one or more missing ranges or the one or more mismatched ranges into the plurality of variable-length data chunks.

14. The non-transitory computer readable media of claim 10, wherein the computer instructions cause the processor to generate the plurality of data chunk identifiers associated with the plurality of variable-length data chunks.

15. A system, comprising:

a processor of a source computing system configured to execute a backup agent to:

receive, from a storage system, range information associated with one or more objects, the range information including a plurality of range chunk identifiers, wherein each of the plurality of range chunk identifiers identifies a corresponding range of chunks within a corresponding object the one or more objects stored as one or more fixed-length data bricks, wherein each of the one or more fixed-length data bricks includes one or more variable-length data chunks identified in the range of chunks, and each of the fixed-length data bricks is associated with brick metadata that includes a respective one of the plurality of range chunk identifiers;

based on the plurality of range chunk identifiers included in the range information received from the storage system, determine at least one of one or more missing ranges or one or more mismatched ranges associated with the one or more objects, wherein:

determining the one or more mismatched ranges includes comparing a range chunk identifier from the plurality of range chunk identifiers that corresponds to a portion of the one or more objects to a current range chunk identifier that corresponds to the portion of the one or more objects, a mismatched range of the one or more mismatched ranges exists when the range chunk identifier identifies a different range of data chunks than a range of data chunks of the current range chunk identifier, and a missing range of the one or more missing ranges exists when the range information does not cover a range corresponding to the current range chunk identifier;

provide, to the storage system, a plurality of data chunk identifiers associated with the one or more variable-length data chunks included in the at least one of the one or more missing ranges or the one or more mismatched ranges associated with the one or more objects;

receive, from the storage system, a response that is used to identify among the plurality of variable-length data chunks, one or more variable-length data chunks not already stored in a storage associated with the storage system; and provide, to the storage system, content of the one or more variable-length data chunks; and a memory coupled to the processor and configured to provide the processor with instructions for executing the backup agent.

* * * * *